United States Patent
Bradley et al.

(10) Patent No.: US 12,010,742 B1
(45) Date of Patent: Jun. 11, 2024

(54) PROXIMITY PAIRING TECHNIQUES FOR AN ACCESSORY DEVICE

(71) Applicant: Apple Inc., Cupertino, CA (US)

(72) Inventors: Bob Bradley, San Jose, CA (US); Jacob S. Weiss, San Francisco, CA (US); Michael J. Giles, San Jose, CA (US); Sriram Hariharan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/666,285

(22) Filed: Oct. 28, 2019

Related U.S. Application Data

(63) Continuation of application No. 16/135,525, filed on Sep. 19, 2018, now abandoned.

(51) Int. Cl.
*H04W 4/029* (2018.01)
*H04B 5/00* (2006.01)
*H04B 17/318* (2015.01)
*H04L 51/043* (2022.01)
*H04L 51/222* (2022.01)
*H04L 65/61* (2022.01)
*H04M 1/72* (2021.01)
(Continued)

(52) U.S. Cl.
CPC .......... *H04W 76/14* (2018.02); *H04B 17/318* (2015.01); *H04L 65/61* (2022.05); *H04W 8/005* (2013.01); *H04W 4/80* (2018.02)

(58) Field of Classification Search
CPC . H04W 4/80; H04W 76/15; H04W 12/00503; H04W 88/02; H04W 76/14; H04W 12/06; H04W 12/63; H04W 12/069; H04M 2207/18; H04M 1/7253; H04M 1/72572; H04M 2250/64; H04M 3/42178; H04L 65/4084; H04N 21/441
USPC .................................................. 455/41.2, 457
See application file for complete search history.

(56) References Cited

U.S. PATENT DOCUMENTS 9,351,154 B1 * 5/2016 Steve ...................... H04W 8/20
10,587,616 B2 * 3/2020 Lewis ..................... H04L 63/20
(Continued)

OTHER PUBLICATIONS

Non-Final Office Action dated Oct. 18, 2019 in U.S. Appl. No. 16/135,525. 21 pages.
(Continued)

*Primary Examiner* — Khaled M Kassim
*Assistant Examiner* — Jason A Harley
(74) *Attorney, Agent, or Firm* — Kilpatrick Townsend & Stockton LLP

(57) ABSTRACT

Embodiments of the present disclosure provide systems, methods, and computer-readable medium for pairing two proximate devices. An advertisement message associated with an accessory device may be received by a host device (e.g., a smart phone). The advertisement message may be communicated using a Bluetooth protocol (e.g., BLE). Payload data may be extracted from the advertisement message and utilized to obtain a media asset (e.g., an image, a video, an icon, etc.) associated with the accessory device. The media asset may be presented via a user interface at the host device. Input may be received indicating a request and/or an approval to perform a pairing procedure with the accessory device. In accordance with the input, the host device may execute the pairing procedure with the accessory device.

22 Claims, 7 Drawing Sheets

(51) Int. Cl.
*H04W 4/44* (2018.01)
*H04W 4/80* (2018.01)
*H04W 8/00* (2009.01)
*H04W 76/10* (2018.01)
*H04W 76/14* (2018.01)
*H04W 84/12* (2009.01)

(56) References Cited

U.S. PATENT DOCUMENTS

| | | | |
|---|---|---|---|
| 2014/0007209 A1* | 1/2014 | Zucker | H04W 12/50 726/7 |
| 2014/0187149 A1 | 7/2014 | Lortz et al. | |
| 2014/0266637 A1* | 9/2014 | Alsina | H04W 4/02 340/12.26 |
| 2015/0296247 A1 | 10/2015 | Glasser | |
| 2016/0021488 A1* | 1/2016 | Viswanadham | H04W 4/80 455/41.2 |
| 2016/0148270 A1 | 5/2016 | Vigier et al. | |
| 2017/0118573 A1* | 4/2017 | Yae | H04W 4/48 |
| 2017/0142334 A1* | 5/2017 | Yamashita | G06F 1/3278 |
| 2017/0201931 A1* | 7/2017 | Swanzey | H04W 12/08 |
| 2017/0201942 A1* | 7/2017 | Mathews | H04M 1/72412 |
| 2018/0063310 A1* | 3/2018 | McGary | H04M 1/72412 |
| 2018/0146045 A1* | 5/2018 | Kang | H04Q 9/00 |
| 2019/0293439 A1 | 9/2019 | Hiruta et al. | |
| 2020/0043057 A1* | 2/2020 | Canekeratne | G06Q 30/0272 |

OTHER PUBLICATIONS

U.S. Appl. No. 17/950,709 , "Final Office Action", dated Aug. 30, 2023, 45 pages.
U.S. Appl. No. 17/950,709 , "Advisory Action", Jan. 2, 2024, 4 pages.
U.S. Appl. No. 17/950,709 , "Non-Final Office Action", Mar. 14, 2024, 42 pages.

* cited by examiner

| Byte | Description |
|---|---|
| -6:-1 | Public Bluetooth Address |

202 { (top table) — 206

230

| Byte | Description |
|---|---|
| 0 | Advertising Structure Length |
| 1 | Service Data Identifier |
| 2:3 | Proximity Service Identifier |
| 4 | Proximity Service Subtype |
| 5:6 | Vendor Identifier |
| 7:8 | Product Identifier |
| 9:10 | Asset Identifier |
| 11:14 | Device Class |
| 15:16 | Supported Features |
| 17 | Supported Transports |
| 18:30 | Reserved |

| Supported Feature | Pairing Transport | Data Transport |
|---|---|---|
| Wireless Vehicle Streaming (Option 1) | BLE | BLE + WiFi |
| Wireless Vehicle Streaming (Option 2) | BTC | BTC + WiFi |
| Smart Access | BLE | BLE |
| Bluetooth Classic | BTC | BTC |

PROXIMITY PAIRING TECHNIQUES FOR AN ACCESSORY DEVICE

CROSS REFERENCES TO RELATED APPLICATIONS

This application is a continuation of U.S. patent application Ser. No. 16/135,525 filed Sep. 19, 2018, which is hereby incorporated by reference in its entirety for all purposes.

BACKGROUND

Various devices are now available that are configured to establish a connection (e.g., via a Bluetooth® protocol) with another device. For example, a user may purchase Bluetooth-enabled audio headphones, which he may pair with his Bluetooth-enabled smartphone.

Conventional pairing techniques may be time-consuming and cumbersome for the user. For example, some conventional pairing techniques may require the user to initially place one or both devices into a pairing mode. While a first device is in pairing mode, the user be required to navigate through various menus on the second device to identify the first device (e.g., from a device selection menu). Additionally, some conventional techniques may require the user to enter a passcode at the first or second device (e.g., "0000"). The user is often then required to confirm the connection after pairing has concluded.

These techniques require significant user input that can be confusing, time-consuming even for experienced users, and/or dangerous (e.g., while operating a vehicle such as a car or bicycle). The very nature of these types of pairing procedures can delay the user from being able to utilize his paired devices. Improvements may be made to conventional pairing procedures to reduce delay and simplify the process of pairing two devices. Additionally, by simplifying the process, user errors may be reduced.

SUMMARY

Embodiments of the present disclosure can provide systems, methods, and computer-readable medium for implementing techniques for pairing devices. In some embodiments, the devices may individually be configured to utilize a short-range communications protocol (e.g., Bluetooth® (BT), Bluetooth Low Energy® (BLE), other protocols, etc.) for executing the pairing methods disclosed herein.

In some embodiments, a computer-implemented method is disclosed. The method may comprise receiving, by a computing device, an advertisement message associated with an accessory device. In some embodiments, the advertisement message being received via a short-range communications transport corresponding to a short-range communications protocol. The method may further comprise extracting, by the computing device, payload data from the advertisement message. The method may further comprise obtaining, by the computing device, a media asset based at least in part on a portion of the payload data. The method may further comprise presenting, by the computing device, a user interface comprising the media asset associated with the accessory device. The method may further comprise receiving, at the user interface of the computing device, an input indicating an approval to perform a pairing procedure with the accessory device. The method may further comprise executing, by the computing device and in accordance with the input, the pairing procedure with the accessory device to pair the computing device with the accessory device. In some embodiments, the pairing procedure is executed independent of additional user input.

In some embodiments, a received signal strength associated with the advertisement message may be obtained by the computing device. The computing device may be configured to determine that the received signal strength satisfies a threshold value. According to some embodiments, obtaining the media asset and presenting the user interface may be performed in response to determining that the received signal strength satisfies the threshold value.

According to some embodiments, the method may further comprise determining an identifier associated with the accessory device based at least in part on the payload data. The computing device may obtain the media asset based at least in part on the identifier associated with the accessory device.

In some embodiments, the method may further comprise determining an identifier associated with the accessory device based at least in part on the payload data. It may be determined by the computing device, that the identifier has no known associated media asset. The computing device may identify a device type associated with the accessory device based at least in part on the payload data. The computing device may obtain the media asset based at least in part on the device type.

In some embodiments, the method may further comprise receiving, by the computing device, an identification message identifying the accessory device. The computing device may determine a pairing action to be performed at the accessory device based at least in part on the identification message. The computing device may present, at the user interface, an indication of the pairing action to be performed at the accessory device.

In some embodiments, the method may further comprise determining, by the computing device, that the pairing procedure has been executed. The method may further comprise identifying, by the computing device, a communications transport (e.g., a data transfer transport) from a plurality of communications transports. The communications transport may be identified based at least in part on the payload data. In some embodiments, the method may further comprise transmitting, by the computing device, additional data to the accessory device via the communications transport.

In some embodiments, a computing device is disclosed. The computing device may comprise at least one processor, and at least one memory storing computer-readable instructions that, upon execution by the at least one processor, configure the computing device to perform operations. The operations may comprise receiving an advertisement message associated with an accessory device, the advertisement message being received via a short-range communications transport corresponding to a short-range communications protocol. The operations may further comprise extracting payload data from the advertisement message. The operations may further comprise obtaining a media asset based at least in part on at least a portion of the payload data. The operations may further comprise presenting a user interface comprising the media asset associated with the accessory device. The operations may further comprise receiving, at the user interface, an input indicating an approval to perform a pairing procedure with the accessory device. The operations may further comprise executing, in accordance with the input, the pairing procedure with the accessory device to pair the computing device with the accessory device.

In some embodiments, the computing device is further configured to identify a data transfer transport based at least in part on at least a portion of the payload data. In some embodiments, the computing device is further configured to establish a communication connection utilizing the data transfer transport. This communications connection may be established in addition to a connection established utilizing the pairing procedure. In some embodiments the pairing procedure may utilize a different transport from the data transfer transport utilized to establish the communication connection for data transfer. The computing device may also be configured to exchange data between the computing device and the accessory device utilizing the data transfer transport. In some embodiments, the data transfer transport is a different communications transport from the short-range communications transport and the short-range communications transport may correspond to a Bluetooth Low Energy® protocol.

In some embodiments, the payload data specifies one or more features supported by the accessory device. Accordingly, in some embodiments, executing the pairing procedure may be based at least in part on the one or more features supported by the accessory device.

The media asset may be associated with at least one of a vendor identifier, a product identifier, or an asset identifier and the payload data may comprise the at least one of the vendor identifier, the product identifier, or the asset identifier.

In some embodiments, a computer-readable storage medium is disclosed. The computer-readable storage medium may have stored thereon computer-executable instructions that, when executed by at least one processor, cause the at least one processor to perform operations. The operations may comprise receiving an advertisement message associated with an accessory device, the advertisement message being received via a short-range communications transport corresponding to a short-range communications protocol. The operations may further comprise extracting payload data from the advertisement message. The operations may further comprise obtaining a media asset based at least in part on at least a portion of the payload data. The operations may further comprise presenting a user interface comprising the media asset associated with the accessory device. The operations may further comprise receiving, at the user interface, an input indicating an approval to perform a pairing procedure with the accessory device. The operations may further comprise executing, in accordance with the input, the pairing procedure with the accessory device.

In some embodiments, the media asset identifies the accessory device or a device type of the accessory device. In some embodiments, the input is provided utilizing a user interface element of the user interface.

In accordance with some embodiments, the operations may further comprise determining that execution of the pairing procedure was successful and establishing a communications channel utilizing a data transfer transport. In some embodiments, the data transfer transport utilized to establish the communications channel may be a different transport than a pairing transport utilized to execute the pairing procedure. The communications channel may be established based at least in part on determining that the execution of the pairing procedure was successful.

In some embodiments, the operations may further comprise maintaining a mapping between a plurality of communications transports and one or more supported features of the accessory device. The operations may further comprise identifying the short-range communications transport based at least in part on the mapping and the payload data and identifying the data transfer transport based at least in part on the mapping and the payload data.

In some embodiments, the at least a portion of the payload data may specify one or more identifiers associated with the accessory device, and the media asset may be associated with at least one of the one or more identifiers.

In some embodiments, the operations may comprise extracting an identifier from the payload data. The operations may further comprise determining that the identifier is not associated with a stored media asset. In some examples, based at least in part on determining that the identifier is not associated with a stored media asset, a device type may be extracted from the payload data and the media asset may be identified based at least in part on the device type.

The following detailed description together with the accompanying drawings will provide a better understanding of the nature and advantages of the present disclosure.

BRIEF DESCRIPTION OF THE DRAWINGS

FIG. 2 is a table illustrating an exemplary payload specification, in accordance with at least one embodiment.

FIG. 3 is a schematic diagram illustrating an example mapping that may be utilized to identify pairing and/or data transports, according to at least one embodiment.

DETAILED DESCRIPTION

Figure 1:
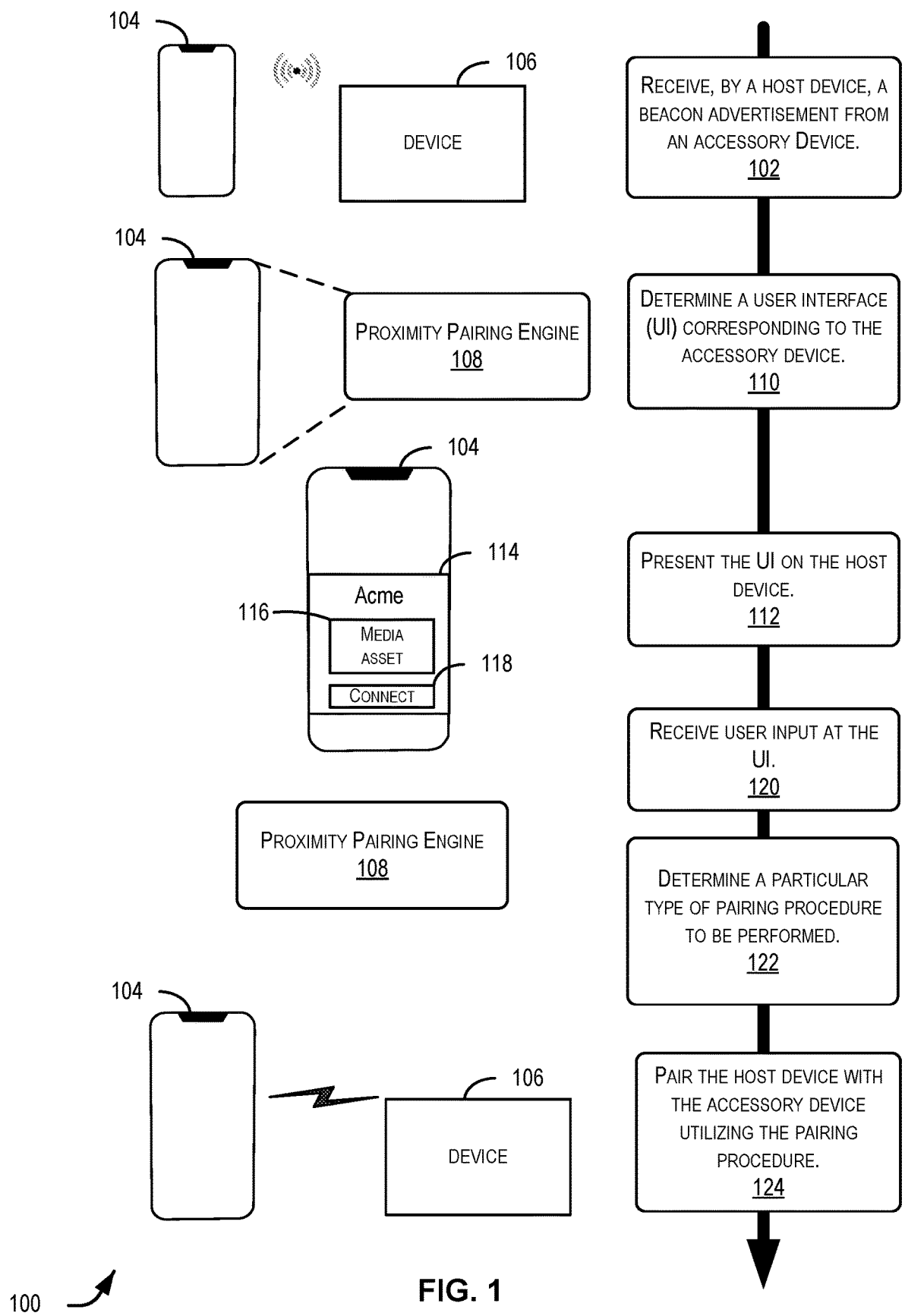
FIG. 1 is a simplified block diagram illustrating an example flow for performing a proximity pairing procedure to pair two devices, in accordance with at least one embodiment.

Certain embodiments of the present disclosure relate to implementing various techniques for pairing devices with one another. In various embodiments, the devices may be proximate to one another (e.g., within a threshold distance of one another) for a pairing procedure to commence. In some instances, the pairing may be between two devices; however, the techniques described herein could also be utilized to pair multiple devices at the same time, as desired.

As a non-limiting example, a user may desire to pair a host device with an accessory device. The host device and/or the accessory device may be any suitable device configured to communicate via a short-range communications protocol (e.g., Bluetooth® (BT), Bluetooth Low Energy® (BLE), etc.). In some embodiments, upon turning on the accessory device and/or subsequent to placing the accessory device in a pairing mode, the accessory device may transmit an advertisement message (e.g., via a short-range beacon message) that includes one or more identifiers of the accessory device. Upon receiving the advertisement message (also referred to as an "advertisement"), the host device may determine if the received signal strength of the advertisement is sufficient to process the message. The received signal strength determined by the host device may be used to approximate the distance between the host device and the accessory device. According to some embodiments, a pairing procedure may be enabled when the host device and the accessory device are within a threshold distance of one another. Accordingly, in some embodiments, if the received signal strength indicator (RSSI) included in the advertisement message does not satisfy a predetermined threshold value (indicating a distance outside of the threshold distance), the host device may discard the advertisement and no further processing may occur. However, if the RSSI satisfies the threshold value, the host device may determine that the accessory device is within a threshold distance of the host device and may continue with further processing. It should be appreciated that the predetermined threshold value may vary depending on the type of accessory device, the type of host device, an amount of battery power remaining on either device, and/or other factors.

Upon receipt of the advertisement message (and/or upon determining that the RSSI satisfies a threshold value), the host device may obtain one or more media assets associated with the accessory device. The one or more media assets may be any suitable electronic asset(s) including one or more images, videos, icons, audio sounds/clips, and/or the like. In some embodiments, the host device may utilize payload data received in the advertisement message to obtain the media asset(s). By way of example, the host device may utilize any suitable combination of a vendor identifier (ID), a product ID, and/or an asset ID to uniquely identify the type and/or specific accessory device. In some examples, the host device may obtain a particular media asset (or assets) that is associated with the vendor ID, product ID, and/or asset ID. In some embodiments, the media asset may be stored and obtained at the host device, while in other embodiments, the host device may request the media asset from a remote computing device (e.g., a server computer configured to manage one or more media assets).

Once a media asset is obtained, the host device may present the media asset via a user interface presented at the display (and/or other appropriate output) of the host device. In some embodiments, the user interface may provide one or more user interface elements (e.g., a button, an edit box, a check box, etc.) for indicating approval to pair with the accessory device associated with the media asset. In this manner, the media asset can be used to provide the user with a visual representation of the accessory device that is available for pairing. Upon selecting one of the user interface elements (e.g., clicking a "connect" button), the host device and accessory device may execute a pairing procedure to establish a data connection. In some embodiments, the host device may determine the appropriate transport (e.g., Bluetooth classic (BTC), BLE, WiFi, etc.) for executing the pairing procedure, based at least in part on additional data contained with the payload data of the advertisement message. Once paired, the accessory device and the host device may potentially execute one or more operations for establishing a separate data transfer connection that utilizes a different transport than that used to execute the pairing procedure. In some embodiments, the host device may determine the appropriate transport for establishing the data transfer connection based at least in part on payload data of the advertisement message. Once paired and/or a data transfer connection is established, the host device and accessory device may exchange any suitable information for any suitable purpose.

The procedures discussed herein may decrease opportunities for user error found in conventional pairing techniques. As the procedures are simplified, requiring less user input than conventional techniques, a delay associated with pairing two devices may be reduced. Additionally, by customizing the user interface provided with a media asset specific to the accessory device, the user may be more well-informed as to the action he is taking, which may reduce inadvertent pairings as well as ambiguity in pairing. This in turn may provide for a more secure pairing experience for the user.

FIG. 1 is a simplified block diagram illustrating an example flow 100 for performing a proximity pairing procedure to pair two devices with one another, in accordance with at least one embodiment. At block (or operation) 102, a host device 104 may receive a beacon advertisement (e.g., a BLE beacon message) from the accessory device 106 (e.g., a vehicle, a lock, an appliance, etc.). The beacon advertisement may, for example, by received by proximity pairing engine 108, which may be operating, at least in part, on the host device 104.

At block 110, the proximity pairing engine 108 may determine a user interface corresponding to the accessory device 106. As a non-limiting example, the proximity pairing engine 108 may be configured to extract various data fields (also referred to as "payload data") from a payload of the beacon advertisement. In some embodiments, some of these data fields may include an identifier associated with the accessory device 106. By way of example, the payload data may include data fields corresponding to a vendor ID, a product ID, and/or an asset ID. Any suitable combination of these identifiers may be utilized by the proximity pairing engine 108 to obtain one or more media assets corresponding to the accessory device 106. As a non-limiting example, the proximity pairing engine 108, operating at the host device 104, may provide the vendor ID, product ID, and/or asset ID to a remote server computer and/or remote service responsible for managing one or more media assets associated with various accessory devices. The remote server computer/service may be configured to utilize the identifier(s) to retrieve and provide a media asset associated with the accessory device 106 (e.g., an image of the device).

At block 112, the user interface (UI) may be presented on the host device. UI 114 is provided in FIG. 1 to illustrate one example user interface. In some embodiments, the proximity pairing engine 108 may be configured to include the media asset 116 (e.g., an image of the device) within the UI 114 as well as one or more user interface elements (e.g., button 118) for providing an option to approve commencement of a pairing procedure between the host device 104 and the accessory device 106.

At block 120, user input may be received by the proximity pairing engine 108. The user input may indicate that the user selected button 118, indicating a desire to commence a pairing procedure between the host device 104 and the accessory device 106.

At block 122, the proximity pairing engine 108 may be configured to determine a particular type of pairing procedure (e.g., BTC, BLE, etc.) to be performed. By way of example, the proximity pairing engine 108 may utilize at least a portion of the payload data of the advertisement message to identify the particular pairing procedure to be performed. In some embodiments, the proximity pairing engine 108 may utilized one or more data fields of the payload data to consult a mapping that indicates a particular pairing procedure to perform. In other embodiments, the mapping may be maintained by a remote source (e.g., a remote server computer) configured to provide the host device 104, upon request, identification of the pairing procedure to be performed with the accessory device 106.

At block 124, the host device 104 and the accessory device 106 may be paired based at least in part on the type of pairing procedure determined at block 122.

FIG. 2 is schematic diagram illustrating an exemplary payload specification 200, in accordance with at least one embodiment. The payload specification 200 may include header 202 and body 204. It is contemplated that each of the header 202 and body 204 may include more or fewer data fields than depicted. Further, the fields, sizes, and formats described for payload specification 200 are examples, and in other implementations the payload specification 200 can include fewer, additional, and/or different fields, and one or more of the fields can have a different size and/or format. In some embodiments, the header 202 may include a Bluetooth public address 206. In some embodiments, Bluetooth public address 206 may include a combination of 12 alphanumeric characters. In some embodiments, Bluetooth public address 206 may be in hexadecimal format and may thus span 48 bits (6 bytes). Bluetooth public address 206 may be utilized within a Bluetooth protocol (e.g., BLE) for identification purposes. For example, the Bluetooth public address 206 may identify the public address of the sender of an advertisement message (e.g., a beacon message).

Within the body 204, any suitable number of data fields may be provided. The payload specification 200 includes, for example, data fields 208-226 and a reserved data field 228. Each of the data fields 208-226 may be associated with one or more bytes of the payload data. The payload specification 200 may include byte indicators 230 (e.g., indicating a byte position of the corresponding data field), however, it should be appreciated that the size and/or order of the data fields 208-226 may vary. For example, although data field 208 is depicted as being provided within the first byte (e.g., byte 0) of the body 204, it should be appreciated that the data field 208 could instead occupy two bytes of the body 204 at a same or different location within the body 204.

In some embodiments, data field 208 (entitled "advertising structure length" in FIG. 2) may be utilized to identify a length (e.g., a number of bits, a number of bytes, etc.) of payload data included within the body 204 an advertisement message. By way of example, the data field 208 may be set to the value 31 if each data field depicted in FIG. 2 is included in the payload data of an advertisement message. As another example, the data field 208 may be set to a value of 18 if data fields 208-226 were utilized, but data field 228 was not utilized.

In some embodiments, data field 210 (entitled "service data identifier" in FIG. 2) may span one byte and may be utilized to identify a service associated with the transport protocol.

In some embodiments, data field 212 (entitled "proximity service identifier" in FIG. 2) may span two bytes and may be utilized to identify a particular service (e.g., a proximity service) related to the advertisement message. Similarly, the data field 214 (entitled "proximity service subtype" in FIG. 2) may span one byte and may be utilized to identify a sub-service (e.g., a subservice of the proximity service).

Generally, the data fields 210-214 may be utilized to identify that an advertisement message relates to proximity pairing of the accessory device.

In some embodiments, data field 216 (entitled "vendor identifier" in FIG. 2) may be utilized to identify a vendor of the accessory device (e.g., Acme A, Vehicle Make B, etc.). The data field 216 may span two bytes and may be any suitable format (e.g., alphanumeric). By way of example, the data field 216 may include a vendor's name or another suitable identifier.

In some embodiments, data field 218 (entitled "product identifier" in FIG. 2) may be utilized to identify a product (e.g., Headphones A, Vehicle Model B, etc.). The data field 218 may span two bytes and may be any suitable format (e.g., alphanumeric). By way of example, the data field 216 may identify a product by any/all of a name, a vendor identifier associated with the product, a model, and/or the like.

In some embodiments, data field 220 (entitled "asset identifier" in FIG. 2) may be utilized to further identify aspects of the accessory device. The data field 220 may span two bytes and may be any suitable format (e.g., alphanumeric). By way of example, the data field 220 may identify a color, a style, a feature, and/or any other suitable characteristic and/or attribute of the accessory device.

Generally, the data fields 216-222, alone, or in combination, may be utilized to identify that an advertisement message relates to accessory device and/or a particular type of accessory device.

In some embodiments, data field 222 (entitled "device class" in FIG. 2) may be utilized to identify a device class (e.g., a category) of the accessory device (e.g., wireless headphones, a vehicle, a car, a truck, a printer, etc.). Data field 222 may be utilized as a single value (e.g., a value and/or enumeration such as "2" that corresponds to a predetermined device type such as "a car") or data field 222 may include multiple values corresponding to a major class (a category) and minor class (a subcategory) of an accessory device. By way of example, one portion of the data field 222 may identify a major class (e.g., vehicle) and a minor class (e.g., car). In some embodiments, the data field 222 may be utilized to identify a default type of accessory device if the device identified with data fields 216-220 is unknown.

In some embodiments, data field 224 (entitled "supported features" in FIG. 2) may be utilized to identify the features supported by an accessory device. The data field 224 may span two bytes and include any suitable value for indicating one or more supported features of the accessory device. In some embodiments, an enumeration may be defined that may be utilized to interpret the value(s) within data field 224. By way of example, a value of 0 may indicate that the accessory device supports a wireless streaming protocol for playing music from the host device at the accessory device. A value of 1 may indicate that the accessory device (e.g., a vehicle) supports wireless access (e.g., remote lock/unlock) initiated by a host device. A value of 2 may indicate that the accessory device may support standard a Bluetooth protocol. It should be appreciated that this is merely one example of how the data field 224 may be utilized. Any suitable manner for identifying the features of the transmitting accessory device may be utilized with data field 224.

In some embodiments, data field 226 (entitled "supported transports" in FIG. 2) may be utilized to identify the pairing transports (e.g., BLE, BTC, etc.) supported by an accessory device. The data field 226 may span a byte and include any suitable value for indicating one or more transports supported by the accessory device. In some embodiments, an enumeration may be defined that may be utilized to interpret the value(s) within data field 226. By way of example, a value of 0 may indicate that the accessory device supports a BLE transport. A value or 1 may indicate that the accessory device supports a BTC transport. In some embodiments, a value of 2 may indicate that the accessory device supports both BLE and BTC transports. It should be appreciated that this is merely one example of how the data field 226 may be utilized. Any suitable manner for identifying the pairing transports supported accessory device may be utilized with data field 226.

In some embodiments, data field 228 (entitled "reserved" in FIG. 2) may be utilized to provide any suitable additional data. In some embodiments, the additional data may relate to the pairing procedure and/or data transfer procedure to be performed with the accessory device. The additional data in some embodiments may additionally or alternatively include any suitable data related to accessory device identification.

FIG. 3 is a schematic diagram illustrating a mapping 300 that may be utilized to identify pairing and/or data transports utilized by an accessory device, according to at least one embodiment. As a non-limiting example, mapping 300 may identify one or more pairing transports and/or one or more data transports to be utilized to execute a supported feature of an accessory device. By way of example, the mapping 300 illustrates that if an accessory device supports a wireless vehicle streaming feature 1, a BLE transport should be utilized to pair with the accessory device, while BLE and Wifi may be utilized for data transport after pairing has occurred. The mapping 300 further illustrates that if an accessory device supports a wireless vehicle streaming feature 2, a BTC transport should be utilized to pair with the accessory device, and BTC and/or Wifi may be utilized for data transport after pairing has occurred. The mapping 300 further illustrates that if an accessory device supports a smart access feature, a BLE transport should be utilized to pair with the accessory device, and the BLE transport may also be utilized for data transport after pairing has occurred. The mapping 300 further illustrates that if an accessory device supports a Bluetooth Classic feature, a BTC transport should be utilized for pairing as well as data transport purposes.

The mapping 300 may be utilized (e.g., by the host device 104 and/or a remote server computer) to identify a pairing transport and/or a data transport to be utilized to pair and/or exchange data with an accessory device. The supported feature of mapping 300 may correspond to the data field 224 of FIG. 2. That is, the data field value included in data field 224 of a received advertisement message may be utilized to perform a lookup utilizing the mapping 300.

It should be appreciated that the mapping 300 is illustrative in nature and the particular contents of the mapping 300 are not intended to limit this disclosure. It is contemplated that additional or alternative types of transports may be identified other than those depicted in FIG. 3. As new data transports are defined, and/or new features are provided by accessory devices, it is contemplated that the mapping 300 may similarly identify these mappings in a similar manner as provided in FIG. 3.

Figure 4:
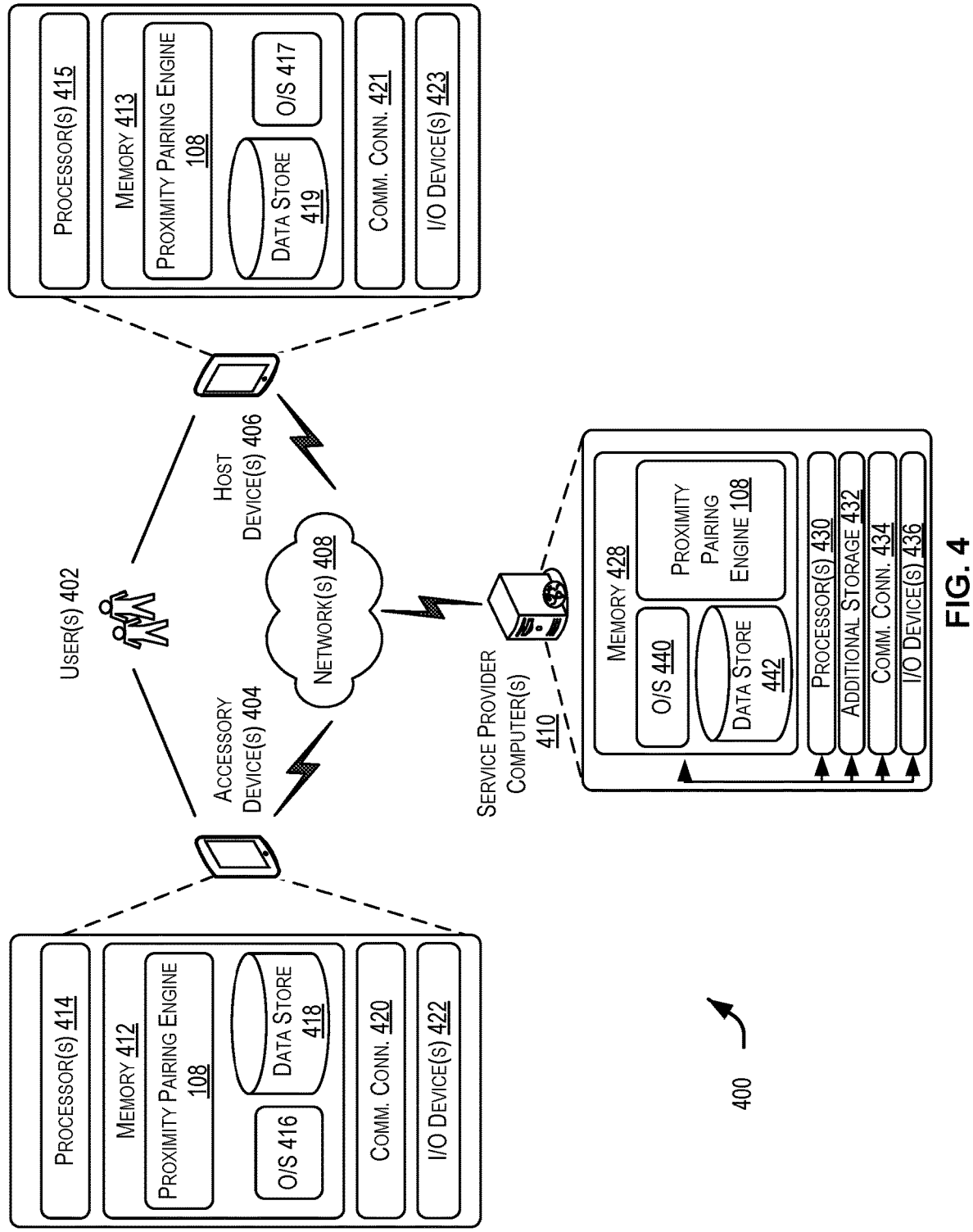
FIG. 4 is a schematic diagram illustrating components of an exemplary system, according to at least one embodiment.

FIG. 4 is a schematic diagram illustrating components of an exemplary system 400, according to at least one embodiment. In system 400, one or more users 402 may desire to pair and utilize an accessory device (e.g., one of the accessory device(s) 404, hereinafter referred to as accessory device 404) with a host device (e.g., one of the host device(s) 406, hereinafter referred to as host device 406).

In some examples, the networks 408 may include any one or a combination of many different types of networks, such as cable networks, the Internet, wireless networks, cellular networks, and other private and/or public networks.

The accessory device(s) 404 and/or the host device(s) 406 may be any suitable type of computing device such as, but not limited to, a mobile phone, a wearable device, a vehicle, a hand-held scanner, a touch screen device, a smartphone, a personal digital assistant (PDA), a laptop computer, a desktop computer, a thin-client device, a tablet PC, an electronic book (e-book) reader, headphones, ear buds, a speaker, or any suitable electronic device configured to communicate via one or more wireless communications protocols (e.g., Bluetooth®, BLE, WiFi, etc.). In some examples, the accessory device(s) 404 and/or the host device(s) 406 may be in communication with the service provider computers 410 via the networks 408, or via other network connections.

In one illustrative configuration, the accessory device(s) 404 and/or the host device(s) 406 may include at least one memory (e.g., memory 412 and memory 413, respectively) and one or more processing units (processor(s)) 414 and/or processor(s) 415, respectively. The processor(s) 414 and 415 may be implemented as appropriate in hardware, computer-executable instructions, firmware, or combinations thereof. Computer-executable instruction or firmware implementations of the processor(s) 414 and 415 may include computer-executable or machine-executable instructions written in any suitable programming language to perform the various functions described.

The memory (e.g., memory 412 and memory 413) may store program instructions that are loadable and executable on the processor(s) 414 or 415, as well as data generated during the execution of these programs. Depending on the configuration and type of device, the memory 412 and/or 413 may be volatile (such as random access memory (RAM)) and/or non-volatile (such as read-only memory (ROM), flash memory, etc.). The accessory device(s) 404 and/or the host device(s) 406 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 412 and/or 413 may include multiple different types of memory, such as static random access memory (SRAM), dynamic random access memory (DRAM), or ROM.

Turning to the contents of the memory 412 and 413 in more detail, the memory 412 and memory 413 may individually include an operating system (e.g., operating system 416 and operating system 417, respectively), one or more data stores (e.g., data store 418 and data store 419, respectively), and one or more application programs, modules, or services for implementing the features of the proximity pairing engine 108 (e.g., the proximity pairing engine 108 of FIG. 1) disclosed herein.

The accessory device(s) 404 and/or the host device(s) 406 may also contain communications connection(s) (e.g., communication connection(s) 420 and communication connection(s) 421, respectively) that allow the accessory device(s) 404 and/or the host device(s) 406 to communicate with a stored database, each other, and/or another computing device or server (e.g., the service provider computers 410) via the networks 408. The accessory device(s) 404 and/or the host device(s) 406 may also include I/O device(s) (e.g., I/O device(s) 422 and I/O device(s) 423, respectively), such as a keyboard, display, a mouse, a pen, a voice input device, a touch input device, a display, one or more speakers, a printer, etc.

In some aspects, the service provider computers 410 may also be any suitable type of computing devices such as, but not limited to, a mobile phone, a wearable device, a smart phone, a personal digital assistant (PDA), a laptop computer, a desktop computer, a server computer, a thin-client device, a tablet, etc. In some examples, the service provider computers 410 may be in communication with the accessory device(s) 404 and/or the host device(s) 406 via the networks 408 or via other network connections. The service provider computers 410 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computers 410 may include at least one memory 428 and one or more processing units (or processor(s)) 430. The processor(s) 430 may be implemented as appropriate in hardware, computer-executable instructions, firmware, or combinations thereof. Computer-executable instruction or firmware implementations of the processor(s) 430 may include computer-executable or machine-executable instructions written in any suitable programming language to perform the various functions described.

The memory 428 may store program instructions that are loadable and executable on the processor(s) 430, as well as data generated during the execution of these programs. Depending on the configuration and type of service provider computers 410, the memory 428 may be volatile (such as RAM) and/or non-volatile (such as ROM, flash memory, etc.). The service provider computers 410 or servers may also include additional storage 432, which may include removable storage and/or non-removable storage. The additional storage 432 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 428 may include multiple different types of memory, such as SRAM, DRAM, or ROM.

The memory 428, the additional storage 432, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 428 and the additional storage 432 are all examples of computer storage media. Additional types of computer storage media that may be present in the service provider computers 410 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 410. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 410 may also contain communications connection(s) 434 that allow the service provider computers 410 to communicate with a stored database, another computing device or server, user terminals and/or other devices on the networks 408. The service provider computers 410 may also include I/O device(s) 436, such as a keyboard, a mouse, a pen, a voice input device, a touch input device, a display, speakers, a printer, etc.

Turning to the contents of the memory 428 in more detail, the memory 428 may include an operating system 440, one or more data stores 442, and/or one or more application programs, modules, or services for implementing the features disclosed herein, such as the features provided by the proximity pairing engine 108.

It should be appreciated that FIG. 4 illustrated one example system, however other system configurations are contemplated. In some embodiments, some portion of the functionality provided by proximity pairing engine 108 may be provided by any suitable combination of the accessory device(s) 404, the host device(s) 406, and/or the service provider computer(s) 410. As another non-limiting example, the functionality provided by the proximity pairing engine 108 of the service provider computer(s) 410 may alternatively be provided by the proximity pairing engine 108 of the host device(s) 406.

Figure 5:
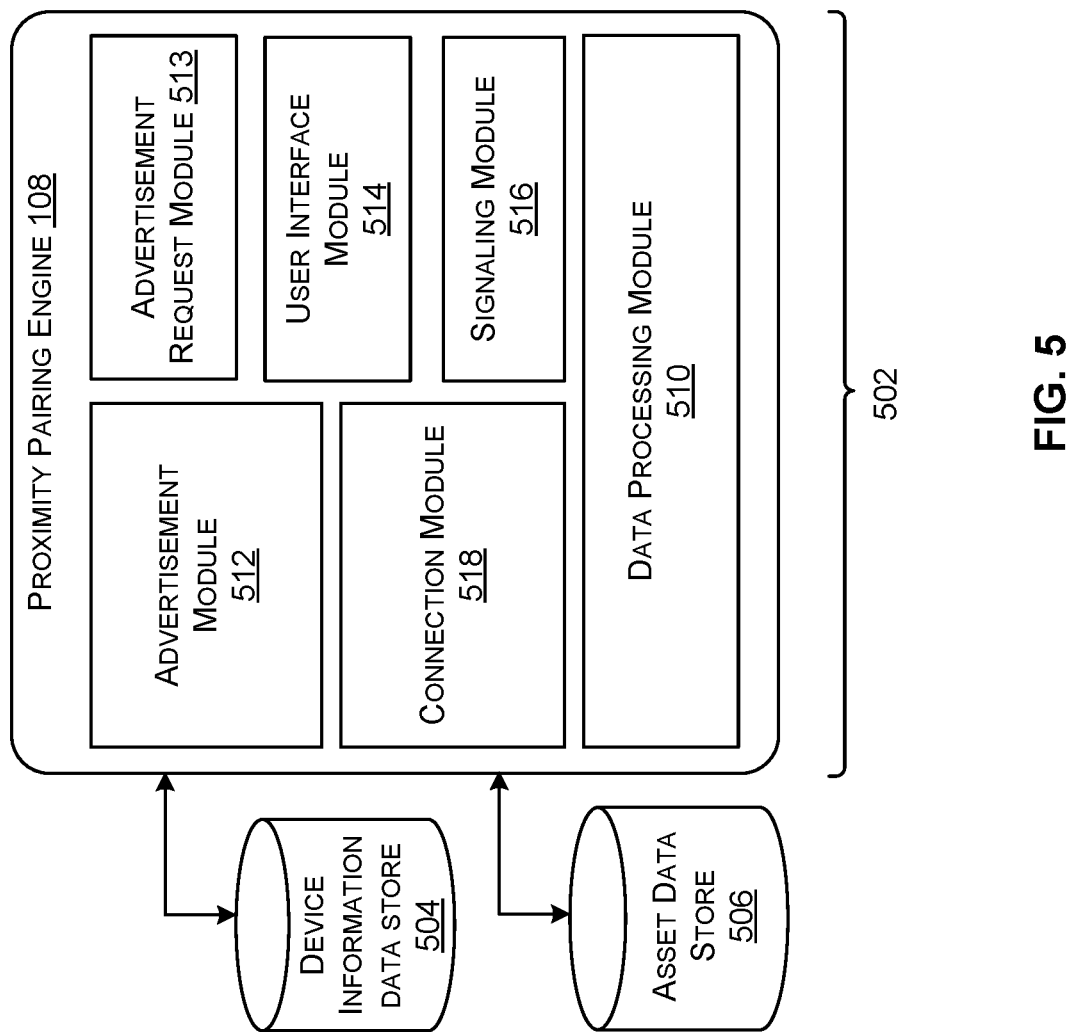
FIG. 5 is a schematic diagram of an example computer architecture for the proximity pairing engine, including a plurality of modules that may perform functions in accordance with at least one embodiment.

FIG. 5 is a schematic diagram of an example computer architecture 500 for the proximity pairing engine 108 of FIG. 4, including a plurality of modules 502 that may perform functions in accordance with at least one embodiment. The modules 502 may be software modules, hardware modules, or a combination thereof. If the modules 502 are software modules, the modules 502 can be embodied on a computer readable medium and processed by a processor in any of the computer systems described herein. It should be noted that any module or data store described herein, may be, in some embodiments, be a service responsible for managing data of the type required to make corresponding calculations. The modules 502 may be exist as part of the proximity pairing engine 108 operating on any suitable combination of the accessory device(s) 404, the host device(s) 406, and/or the service provider computer(s) 410 of FIG. 4, or the modules may exist as separate modules or services external to those devices.

In the embodiment shown in the FIG. 5, a device information data store 504 and an asset data store 506 are shown, although data can be maintained, derived, or otherwise accessed from various data stores, either remote or local to the proximity pairing engine 108, to achieve the functions described herein. In at least one embodiment, the data stores described herein may be accessible to the accessory device(s) 404, the host device(s) 406, and/or the service provider computer(s) 410 or alternatively, any suitable combination of the data stores may be operated as part of such devices. The proximity pairing engine 108, as shown in FIG. 5, includes various modules such as a data processing module 510, an advertisement module 512, an advertisement request module 513, a user interface module 514, a signaling module 516, and a connection module 518. Some functions of the modules 510-518 are described below. However, for the benefit of the reader, a brief, non-limiting description of each of the modules is provided in the following paragraphs. In accordance with at least one embodiment, a process is enabled for pairing two proximate devices.

In at least one embodiment, the proximity pairing engine 108 includes the data processing module 510. Generally, the data processing module 510 may be utilized to receive any suitable information with respect to any example provided herein. In some embodiments, the data processing module 510 may include any suitable number of application programming interfaces with which the functionality of the proximity pairing engine 108 may be invoked.

In some embodiments, the data processing module 510 may be configured to receive device information and/or media assets. As used herein, device information may include any suitable information related to a device. By way of example, the device information may include instructions for placing an accessory device in pairing mode. Device information may additionally or alternatively include any information described above with respect to FIG. 2 that relates to a device and/or a class of devices. As used herein, a media asset may include any suitable electronic asset related to a particular type of device or class of devices. By way of example, a media asset could include images, videos, audio, icons, or the like which depict an image, a video, an animation, a sound, or any suitable visual or audible depiction of a type of device (e.g., a particular vehicle, headphone, printer, etc.) or a class of devices (e.g., cars, trucks, headphones, printers, etc.). In some embodiments, the data processing module 510 may be configured to store received device information within device information data store 504, a storage location suitable for storing such information. Likewise, the data processing module 510 may be configured to store received media assets with asset data store 506. In some embodiments, device information and/or the media asset related to a particular device or a class of devices may be stored as an association with a vendor identifier, a product identifier, an asset identifier, and/or a device type. The vendor identifier, product identifier, asset identifier, and/or device type may be the same format as those described in the corresponding data fields discussed above in connection with FIG. 2.

In some embodiments, the data processing module 510, perhaps operating at the service provider computer(s) 410 of FIG. 4, may be configured to receive a request for device information and/or media asset(s) associated with a particular device or type of device (e.g., an accessory device or type of accessory device). The data processing module 510 may be configured to retrieve the request device information and/or media asset(s) from the device information data store 504 and/or the asset data store 506 and transmit them to the requesting device (e.g., a host device).

In at least one embodiment, the proximity pairing engine 108 includes the advertisement module 512. The advertisement module 512 may be configured to manage transmissions of beacon advertisements. By way of example, the advertisement module 512 may operate as part of an accessory device (e.g., the accessory device(s) 404 of FIG. 4) and/or as part of a host device (e.g., the host device(s) 406 of FIG. 4). In some embodiments, the advertisement module 512 (e.g., operating on the accessory device(s) 404) may be configured to transmit an advertisement message according to a communication protocol (e.g., as a BLE beacon message). The advertisement message transmitted by the advertisement module 512 (e.g., operating on the accessory device(s) 404) may include the payload data described above in connection with FIG. 2. The advertisement module 512 (e.g., operating on the accessory device(s) 404) may transmit a beacon message according to a predetermined protocol set. In some embodiments, the advertisement module 512 (e.g., operating on the accessory device(s) 404) may be configured to receive an indication that the device on which the proximity pairing engine 108 operates (e.g., an accessory device) has entered pairing mode. Based on this indication, the advertisement module 512 (e.g., operating on the accessory device(s) 404) may be configured to transmit a beacon message utilizing the device information contained in the device information data store 504 as corresponding data fields of payload data. The advertisement message may be transmitted any suitable number of times, for any suitable duration, at any suitable rate (e.g., for 90 seconds every 20 milliseconds or until a pairing request is received from a host device). Upon identifying that a pairing request has been received, the advertisement module 512 (e.g., operating on the accessory device(s) 404) may be configured to cease transmission of the advertisement message.

In at least one embodiment, the advertisement module 512 (e.g., operating on the accessory device(s) 404) may be configured to receive (e.g., via the data processing module 510 or otherwise) an advertisement request. By way of example, the advertisement module 512 operating on an accessory device may be receive an advertisement request from a host device (e.g., the host device(s) 406 of FIG. 4). Upon receipt, or at another suitable time, the advertisement module 512 (e.g., operating on the accessory device(s) 404 of FIG. 4) may be configured to transmit an advertisement message (or a number of advertisement messages) in response to the request. The advertisement message, as discussed above, may include any suitable combination of device information related to the accessory device including, but not limited to, device information corresponding to the data fields of FIG. 2. Any of the advertisement messages discussed herein may be formatted according to the payload specification 200 of FIG. 2.

In at least one embodiment, the advertisement module 512 (e.g., an advertisement module operating on the host device(s) 406) may be configured to receive (e.g., via the data processing module 510 or otherwise) an advertisement message (e.g., an advertisement message transmitted by the accessory device(s) 404). The advertisement module 512 may further be configured to invoke the functionality of the signaling module 516 and/or the user interface module 514 upon receipt of the advertisement message.

In at least one embodiment, the proximity pairing engine 108 includes the advertisement request module 513. In some embodiments, the advertisement request module 513 may operate on any suitable device. By way of example, a proximity pairing engine 108 may, at least in part, operate at a host device (e.g., the host device(s) 406 of FIG. 4). The advertisement request module 513 may be configured to transmit (according to a predetermined ruleset) an advertisement request to elicit advertisement messages from nearby devices (e.g., accessory devices within a threshold distance of the host device).

In at least one embodiment, if an advertisement message is received by the advertisement module 512 that was initially requested by the advertisement request module 513, the advertisement module 512 may be configured to invoke the functionality of the user interface module 514. By way of example, the user interface module 514 may be configured to identify instructions from the device information data store 504 corresponding to an accessory device identified in the advertisement message (e.g., identified by vendor ID, product ID, asset ID, and/or device class). In some embodiments, the instructions may detail user actions required to place a particular accessory device in a pairing mode. Once identified, the instructions may be presented at a host device via a user interface provided by the user interface module 514. The user interface may include, in some embodiments, any suitable media asset associated with the accessory device that is stored in the asset data store 506.

In at least one embodiment, if an advertisement message is received by the advertisement module 512 that was not initially requested by the advertisement request module 513, the advertisement module 512 may be configured to invoke the functionality of the signaling module and/or the user interface module 514.

In at least one embodiment, the proximity pairing engine 108 includes the signaling module 516. In some examples, the signaling module 516 may operate at a host device (e.g., the host device(s) 406). The signaling module 516 may be configured to receive an advertisement message. Upon receipt, or at another suitable time, the signaling module 516 may be configured to obtain a received signal strength indication. In some embodiments, the signaling module 516 may identify a power level received by a communications antenna of the host device. In some embodiments the received signal strength indication (RSSI) may be provided to the signaling module 516 as part of the advertisement message. The signaling module 516 may be configured to identify whether the RSSI satisfies a predetermined condition. By way of example, the signaling module 516 may be configured to determine whether the RSSI meets or exceeds a threshold signal strength value. The threshold signal strength value utilized may be universally applied regardless of the transmitting device. Alternatively, the threshold signal strength value may vary depending on the transmitting device. By way of example, the signaling module 516 may be configured to utilize payload data of the advertisement message (e.g., vendor ID, product ID, asset ID, and/or device class) to identify a threshold signal strength value. In some embodiments, the threshold signal strength value corresponding to a particular device and/or class of devices may be retrievable from the device information data store 504. If the RSSI meets or exceeds the threshold signal strength value, the signaling module 516 may be configured to invoke functionality of the user interface module 514. If the RSSI of the advertisement message does not meet or exceed the threshold signal strength value, the signaling module 516 may be configured to discard the advertisement message and processing of the advertisement message may cease.

In at least one embodiment, the user interface module 514 (e.g., operating at a host device) may be configured to receive an advertisement message (or the payload data of the advertisement message) from the signaling module 516 or the advertisement module 512. The user interface module 514 may extract one or more data fields from the payload data (e.g., vendor ID, product ID, asset ID, and/or device class). If the asset data store 506 is accessible to the user interface module 514, the user interface module 514 may retrieve one or more media assets, e.g., associated with any suitable value or combination of the vendor ID, product ID, asset ID, and/or device class. If the asset data store 506 is not accessible to the user interface module 514, the user interface module 514 may be configured to request one or more media assets from another device that has access to the asset data store 506 (e.g., the service provider computer(s) 410). The user interface module 514 may further be configured to receive one or more media assets from that device. Upon obtaining the media asset(s) corresponding to the accessory device/type of accessory device identified in the advertisement message, the user interface module 514 may be configured to format and present a user interface at the host device. The user interface may include the media asset(s) and one or more user interface elements (e.g., buttons, checkboxes, edit boxes, etc.) for eliciting user input. As a non-limiting example, the user interface may include an image of the accessory device and a button for requesting/ receiving pairing approval from the user. Upon receiving an indication that the user has selected the button (or appropriate user interface element), the user interface module 514 may be configured to invoke functionality of the connection module 518.

In at least one embodiment, the proximity pairing engine 108 may include the connection module 518. The connection module 518 may utilize payload data of an advertisement message to obtain a mapping associated with an identified accessory device (e.g., mapping 300). In at least one embodiment, the connection module 518 may consult the mapping to identify a pairing transport to utilize in order to pair a host device with the accessory device identified by the payload data. The connection module 518 may utilize predetermined protocols associated with the pairing transport to execute any suitable instructions for pairing the host device with the accessory device according to the pairing transport. In some embodiments, the connection module 518 may identify when the devices have been successfully paired. The connection module 518 may further be configured to establish a data connection between the host device and the accessory device according to a data transport identified in the mapping. In some embodiments, the data connection may utilize a data transport that is different than the pairing transport utilized to pair the devices. The devices may exchange any suitable credentials, passwords, and/or keys as part of the procedure for establishing the data connection. In some embodiments, the pairing connection may be terminated upon establishment of the data connection corresponding to the data transport.

Once the pairing connection and/or the data connection has been established, the devices may be configured to exchange any suitable type of data according to those connections and their corresponding transports.

Figure 6:
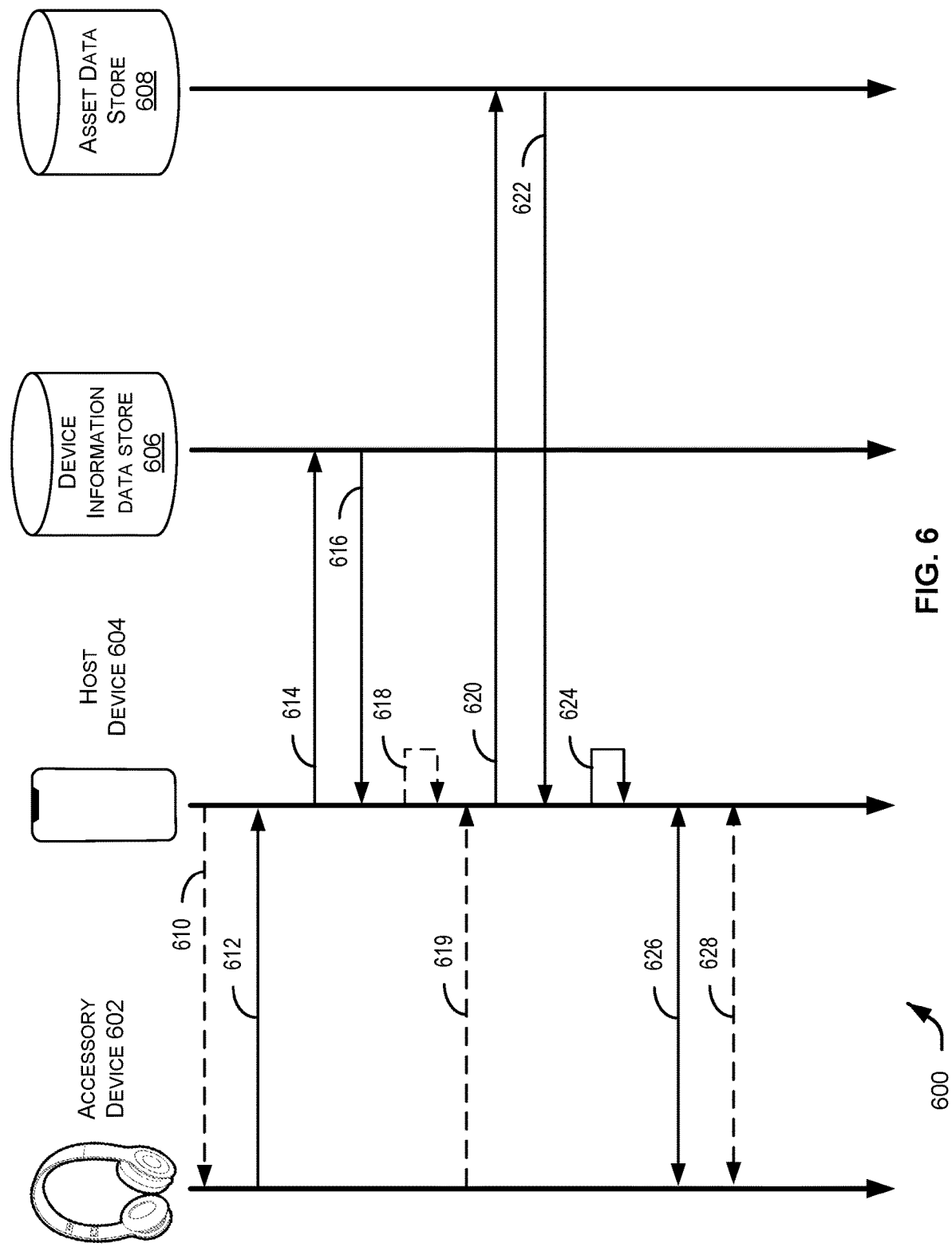
FIG. 6 illustrates an example protocol for providing proximity pairing techniques, in accordance with at least one embodiment.

FIG. 6 illustrates an example protocol 600 for providing proximity pairing techniques, in accordance with at least one embodiment. The protocol 600 may include an accessory device 602 (e.g., one of the accessory device(s) 404 of FIG. 4), a host device 604 (e.g., one of the host device(s) 406 of FIG. 4), a device information data store 606, and an asset data store 608. As briefly described above, the device information data store 606 and/or the asset data store 608 may be accessible to the host device 604 and/or the device information data store 606 and/or the asset data store 608 may be accessible to the service provider computer(s) 410 of FIG. 4. In examples in which the device information data store 606 and/or the asset data store 608 are accessible to the service provider computer(s) 410, the host device 604 may be configured to obtain device information and media assets from the corresponding data stores via the service provider computer(s) 410.

In some embodiments, the host device 604 may transmit an advertisement request at 610. The advertisement request may be utilized to elicit an advertisement message from the accessory device 602. The host device 604 may be configured to transmit the advertisement request any suitable number of times, at any suitable time and/or according to any suitable interval (e.g., every 30 seconds, upon discovering an accessory device, etc.). It should be appreciated, that in some embodiments, the host device 604 need not transmit the advertisement request at all. For example, it should be appreciated that protocol 600 need not begin at 610, but rather could begin at 612 (e.g., when the accessory device 602 is already in a pairing mode).

At 612, the accessory device 602 may be configured to transmit an advertisement message (in response to the advertisement request transmitted at 610 or otherwise, for example, because the accessory device 602 is in a pairing mode). The advertisement message may be formatted according to the payload specification 200 of FIG. 2. In some embodiments, the advertisement message may be transmitted (e.g., by the advertisement module 512 of FIG. 5, operating at the accessory device 602) according to any suitable communications protocol (e.g., a short-range communications protocol such as BLE).

At 614, the host device 604 may receive the advertisement message and request device information corresponding to the accessory device 602 from the device information data store 606 (directly, or via the service provider computer(s) 410 of FIG. 4). In at least one embodiment, the device information may be requested utilizing any suitable one or combination of a vendor ID, product ID, asset ID, and/or device class extracted from the payload data of the advertisement message. The device information may be retrieved by the device information data store 606 (e.g., by performing a lookup utilizing the vendor ID, product ID, asset ID, and/or device class) and transmitted to the host device 604 at 616.

At 618, if the advertisement message was transmitted in response to the advertisement request transmitted at 610, the host device 604 may present at least a portion of the device information via a user interface of the host device 604. By way of example, if the advertisement message received at 612 was elicited by an advertisement request at 610, the device information received at 616 may include instructions for placing the accessory device 602 in a pairing mode. These instructions may be presented at the host device 604 to provide the user instructions to describe the steps required for placing the accessory device 602 in pairing mode. Once in pairing mode, the accessory device may then be configured to transmit another advertisement message at 619 indicating that the accessory device is in pairing mode. In some embodiments, the advertisement message transmitted at 619 may include similar payload data as the payload data transmitted in the advertisement message transmitted at 612. If however, the advertisement message transmitted at 612 was not in response to the advertisement request transmitted at 610, the host device 604 may forgo presentation of the device instruction for placing the accessory device 602 in pairing mode and the accessory device 602 may forgo the additional advertisement message transmission at 619.

At 620, the host device 604 may request (e.g., directly or via the service provider computer(s) 410) one or more media assets from the asset data store 608. In some embodiments, the media asset request may include any suitable one or combination of vendor ID, product ID, asset ID, and/or device class. As a non-limiting example, the asset data store 608 may be configured to utilize the vendor ID, product ID, and asset ID to retrieve one or more media assets corresponding to the accessory device 602. However, if no media assets are associated with the vendor ID, product ID, and/or asset ID, the asset data store 608 may be configured to identify a default media asset corresponding to the device class (e.g., car, truck, headphones, etc.). The identified asset(s) may be provided to the host device 604 at 622.

At 622, the host device 604 may present a user interface including the media asset(s) and one or more user interface elements. The user interface elements may be configured to provide the user with the ability to approve the pairing connection with the accessory device 602.

At 624, input may be received by the host device 604 indicating a request to perform a pairing procedure with the accessory device 602. In at least one embodiment, the host device 604 may be configured to identify a pairing transport for performing the pairing procedure. By way of example, the host device 604 may utilize a portion of the device information (e.g., the mapping 300 of FIG. 3) obtained from the device information data store 606 at 616 to identify the pairing transport for the accessory device. In some embodiments, the pairing transport may depend on particular features supported by the accessory device 602 and identified in the payload data of the advertisement message.

At 626, the accessory device 602 and the host device 604 may execute any suitable operations for establishing a pairing connection according to the pairing transport identified at 624. Upon successful completion of the pairing process performed at 628, the host device 604 and the accessory device 602 are paired.

In some embodiments, the host device 604 may further be configured to identify a data transport at 624 from the device information (e.g., the mapping 300). In some embodiments, the data transport may be different from the pairing transport utilized to pair the accessory device 602 with the host device 604. Accordingly, in some embodiments, the accessory device 602 and the host device 604 may execute any suitable operations for establishing a data connection according to the data transport identified at 624. Upon successful establishment of the data connection, the host device 604 and the accessory device 602 may be exchange any suitable data (e.g., audio streams, video stream, images, text, etc.).

Figure 7:
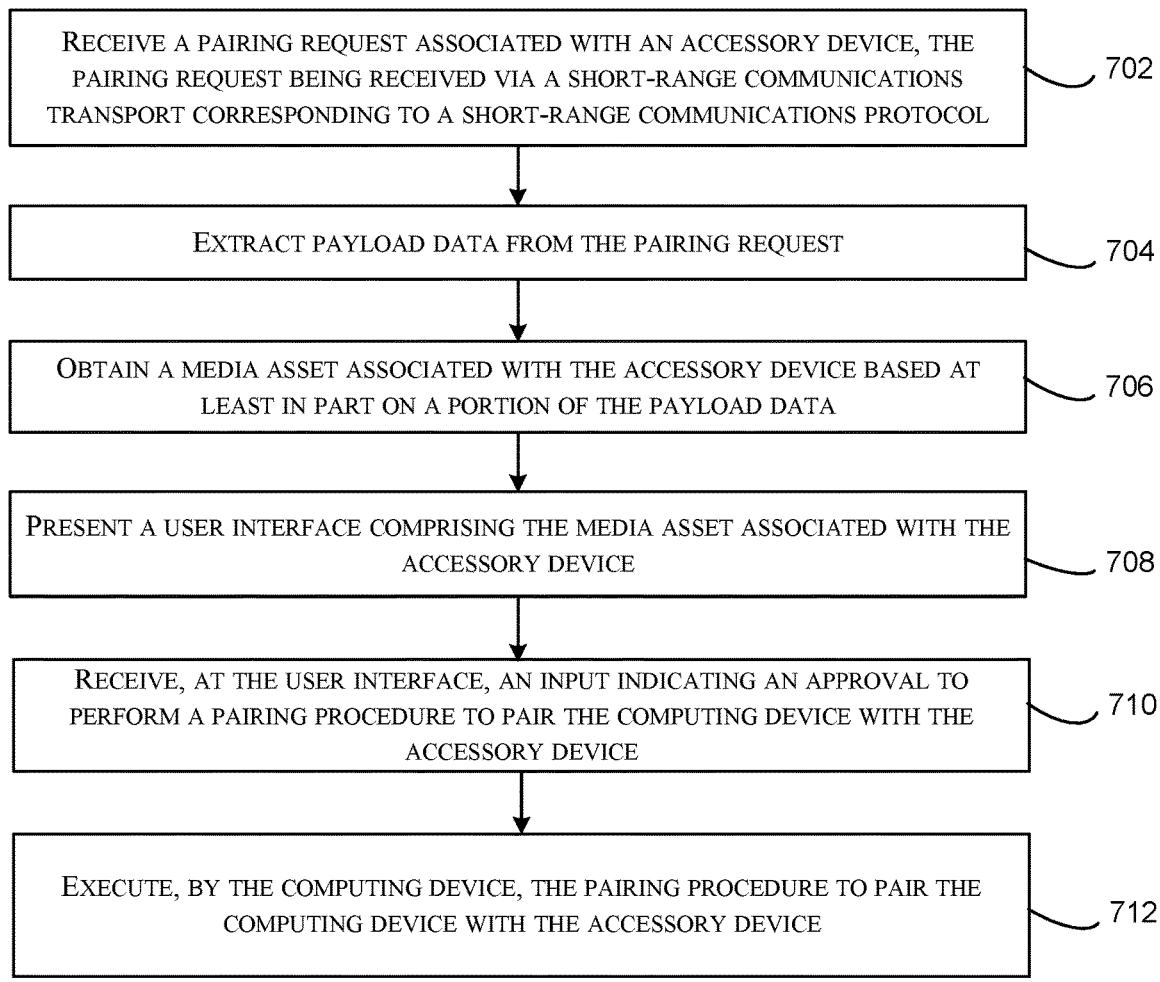
FIG. 7 is a flow diagram to illustrate an example method for providing proximity pairing, in accordance with at least one embodiment.

FIG. 7 is a flow diagram to illustrate an example method 700 for providing proximity pairing, in accordance with at least one embodiment. Method 700 may be performed at a computing device (e.g., a host device such as the host device(s) 406 of FIG. 4) having at least one processor and at least one memory storing computer-readable instructions. Execution of the computer-readable instruction by the at least one processor may configure the computing device to execute the operations of method 700. It should be appreciated that the operations of method 700 may be performed in any suitable order. Additional operations may be included, or at least one of the operations of method 700 may be excluded in some embodiments.

At block 702, the computing device (e.g., advertisement module 512 of FIG. 5) may receive an advertisement message associated with an accessory device. The advertisement message may be received via a short-range communications transport corresponding to a short-range communications protocol. For example, the advertisement message may be received via a BLE transport.

At block 704, the computing device (e.g., user interface module 514 of FIG. 5) may extract payload data from the advertisement message. In some embodiments, the payload data may include the data fields of FIG. 2 in the format specified by the payload specification 200.

At block 706, the computing device (e.g., the user interface module 514) may obtain a media asset associated with the accessory device based at least in part on a portion of the payload data. By way of example, the computing device may provide one or more of a vendor ID, product ID, asset ID, and/or device class obtained from the payload data to the service provider computer(s) 410 of FIG. 4 and/or to the asset data store 506 directly. The service provider computer(s) 410 and/or the asset data store 506 may provide any known assets associated with the provided information. If the asset is associated with the vendor ID, product ID, and/or asset ID, the asset may correspond to the particular accessory device 602. If the asset is associated with the device class, the asset may be associated with a type associated with the accessory device 602. In other words, the asset (e.g., an image) may depict the accessory device 602 in particular, or if such an asset is unavailable, the asset may depict a category (e.g., wireless headphones) associated with the accessory device 602.

At block 708, the computing device (e.g., the user interface module 514) may present a user interface comprising the media asset associated with the accessory device. As a non-limiting example, the user interface may be similar to the UI 114 of FIG. 1. In some embodiments, the user interface may include the media asset obtained at block 706. The user interface may additionally include any suitable number of user interface elements (e.g., buttons, checkboxes, edit boxes, and the like) for eliciting input.

At block 710, the computing device (e.g., the user interface module 514) may receive (e.g., via the user interface presented at block 708) an input indicating an approval to perform a pairing procedure to pair the computing device with the accessory device. By way of example, the input may indicate that the button 118 of FIG. 1 was selected.

At block 712, the computing device (e.g., the connection module 518 of FIG. 5) may execute, in accordance with the input, the pairing procedure to pair the computing device with the accessory device. In at least one embodiment, the pairing procedure may utilize a pairing transport identified by the computing device from an association with the accessory device. By way of example, the connection module 518 may retrieve mapping 300 of FIG. 3 and utilize payload data of the advertisement message to identify the pairing transport to be utilized for pairing. The pairing procedure may correspond to the pairing transport identified.

Illustrative methods, computer-readable medium, and systems for providing various techniques for pairing proximate devices are described above. Some or all of these systems, media, and methods may, but need not, be implemented at least partially by architectures and flows such as those shown at least in FIGS. 1-7 above. It should be understood that any of the above techniques can be used within any type of application operating at an accessory device or a host device. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, accessory devices and/or host devices which can be used to operate any of a number of applications. Accessory devices and/or host devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art (except for transitory media like carrier waves or the like) such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

However, as noted above, computer-readable storage media does not include transitory media such as carrier waves or the like.

As described above, one aspect of the present technology provides device information via advertisement messages. The present disclosure contemplates that in some instances, this gathered data may include personal information data that uniquely identifies or can be used to contact or locate a specific person utilizing the device information. The present disclosure recognizes that the use of such personal information data, in the present technology, can be used to the benefit of users. For example, the device information can be used to provide an efficient and user-friendly way to pair accessory and host devices.

The present disclosure contemplates that the entities responsible for the collection, analysis, disclosure, transfer, storage, or other use of such personal information data (e.g., device information) will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in some embodiments, the user may opt out of performing the pairing procedures and/or data connection procedures discussed herein. In addition to providing "opt in" and "opt out" options, the present disclosure contemplates providing notifications relating to the access or use of personal information. In some embodiments, the present disclosure contemplates providing a notification that a device has been paired to the user's device. This may notify the user of potentially fraudulent pairing by unauthorized users.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers, controlling the amount or specificity of data stored, controlling how data is stored, and/or other methods.

Therefore, although the present disclosure broadly covers use of personal information data to implement one or more various disclosed embodiments, the present disclosure also contemplates that the various embodiments can also be implemented without the need for accessing such personal information data.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims), are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise be read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

As described above, one aspect of the present technology provides device information via advertisement messages. The present disclosure contemplates that in some instances, this gathered data may include personal information data that uniquely identifies or can be used to contact or locate a specific person utilizing the device information. The present disclosure recognizes that the use of such personal information data, in the present technology, can be used to the benefit of users. For example, the device information can be used to provide an efficient and user-friendly way to pair accessory and host devices.

The present disclosure contemplates that the entities responsible for the collection, analysis, disclosure, transfer, storage, or other use of such personal information data (e.g., device information) will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in some embodiments, the user may opt out of performing the pairing procedures and/or data connection procedures discussed herein. In addition to providing "opt in" and "opt out" options, the present disclosure contemplates providing notifications relating to the access or use of personal information. In some embodiments, the present disclosure contemplates providing a notification that a device has been paired to the user's device. This may notify the user of potentially fraudulent pairing by unauthorized users.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers, controlling the amount or specificity of data stored, controlling how data is stored, and/or other methods.

Therefore, although the present disclosure broadly covers use of personal information data to implement one or more various disclosed embodiments, the present disclosure also contemplates that the various embodiments can also be implemented without the need for accessing such personal information data.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

Illustrative embodiments of this disclosure are described herein, including the best mode known to the inventors for carrying out the disclosure. Variations of those illustrative embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computing device prior to pairing with an accessory device, an advertisement message associated with the accessory device, the advertisement message being received via a short-range communications transport corresponding to a short-range communications protocol; extracting, by the computing device, payload data from the advertisement message; identifying, by the computing device, a device type associated with the accessory device based at least in part on the payload data;
   obtaining, by the computing device, a media asset image from a media asset data store based at least in part on the identified device type, wherein the media asset image is a default media asset image when a media asset image associated with the identified device type is not included in the media asset data store; presenting, by the computing device, a user interface displaying the obtained media asset image, wherein the media asset image represents the accessory device; receiving, via the user interface displaying the media asset image, a user input comprising a selection of the media asset image, the user input indicating approval to perform a pairing procedure to pair the computing device with the accessory device; and executing, by the computing device, the pairing procedure to pair the computing device with the accessory device.

2. The computer-implemented method of claim 1, wherein the pairing procedure is executed independent of additional user input.

3. The computer-implemented method of claim 2, further comprising:
obtaining, by the computing device, a received signal strength associated with the advertisement message; and
determining, by the computing device, that the received signal strength satisfies a threshold value, wherein obtaining the media asset image and presenting the user interface are performed in response to determining that the received signal strength satisfies the threshold value.

4. The computer-implemented method of claim 1, wherein obtaining the media asset image further comprises:
determining an identifier associated with the accessory device based at least in part on the payload data; and
obtaining the media asset image based at least in part on the identifier associated with the accessory device.

5. The computer-implemented method of claim 1, further comprising, prior to identifying the device type associated with the accessory device:
determining an identifier associated with the accessory device based at least in part on the payload data; and
determining, by the computing device, that the media asset image corresponding to the identifier is unavailable.

6. The computer-implemented method of claim 1, further comprising:
receiving, by the computing device, an identification message identifying the accessory device;
determining, by the computing device, a pairing action to be performed at the accessory device based at least in part on the identification message; and
presenting, at the user interface of the computing device, an indication of the pairing action to be performed at the accessory device.

7. The computer-implemented method of claim 1, further comprising:
determining, by the computing device, that the pairing procedure has been executed;
identifying, by the computing device, a communications transport from a plurality of communications transports, the communications transport being identified based at least in part on the payload data; and
transmitting, by the computing device, additional data to the accessory device via the communications transport.

8. The method according to claim 1, wherein the computing device automatically receives the advertisement message from the accessory device, and wherein the computing device receives the advertisement message from the accessory device without user input on the computing device.

9. The method according to claim 1, wherein the media asset image is an electronic asset comprising an image, a video, an icon, an audio sound, or an audio clip representing the accessory device for pairing with the computing device.

10. The method according to claim 1, further comprising presenting, by the computing device, the user interface displaying an identifier of the media asset image in addition to the media asset image associated with the accessory device.

11. The method according to claim 1, wherein the media asset image identifies the accessory device to be paired with the computing device, and wherein selection of a user interface element representing the media asset image pairs the identified accessory device with the computing device.

12. The method according to claim 1, wherein after the computing device receives the user input comprising the selection of the media asset, the computing device executes the pairing procedure to pair the computing device with the accessory device without requiring a user input on the accessory device.

13. The method according to claim 1, wherein the media asset image associated with the accessory device from which the advertisement message including the payload data is received is an image displaying the accessory device to be paired with the computing device.

14. The method according to claim 1, wherein the media asset image presented on the user interface is an image of the accessory device to be paired with the computing device.

15. The method according to claim 1, wherein the media asset image that is presented on the user interface is a single image representing the accessory device to be paired with the computing device, and wherein the user input comprises selection of the single image that is presented on the user interface.

16. A computing device, comprising: at least one processor; and at least one memory storing computer-readable instructions that, upon execution by the at least one processor, configures the computing device to: receive, prior to pairing with an accessory device, an advertisement message associated with the accessory device, the advertisement message being received via a short-range communications transport corresponding to a short-range communications protocol; extract payload data from the advertisement message; identify, by the computing device, a device type associated with the accessory device based at least in part on the payload data; obtain, by the computing device, a media asset image from a media asset data store based at least in part on the identified device type, wherein the media asset image is a default media asset image when a media asset image associated with the identified device type is not included in the media asset data store; present a user interface displaying the obtained media asset image, wherein the media asset image represents the accessory device; receive, via the user interface displaying the media asset image, a user input comprising a selection of the media asset image, the user input indicating approval to perform a pairing procedure to pair the computing device with the accessory device; and execute, in accordance with the user input, the pairing procedure to pair the computing device with the accessory device.

17. The computing device of claim 16, wherein the computing device is further configured to:
identify a data transfer transport based at least in part on at least a portion of the payload data; and
exchange data with the accessory device utilizing the data transfer transport.

18. The computing device of claim 16, wherein the media asset image is associated with at least one of a vendor identifier, a product identifier, or an asset identifier, and wherein the payload data comprises the at least one of the vendor identifier, the product identifier, or the asset identifier.

19. A computer-readable storage medium having stored thereon computer-executable instructions that, when executed by at least one processor, cause the at least one processor to perform operations comprising: receiving, prior to pairing with an accessory device, an advertisement message associated with the accessory device, the advertisement message being received via a short-range communications transport corresponding to a short-range communications protocol; extracting payload data from the advertisement message; identifying a device type associated with the accessory device based at least in part on the payload data; obtaining a media asset image from a media asset data store based at least in part on the identified device type, wherein the media asset image is a default media asset image when a media asset image associated with the identified device type is not included in the media asset data store; presenting a user interface displaying the obtained media asset image, wherein the media asset image represents the accessory device; receiving, via the user interface displaying the media asset image, a user input comprising a selection of the media asset image, the user input indicating approval to perform a pairing procedure to pair with the accessory device; and executing, in accordance with the user input, the pairing procedure.

20. The computer-readable storage medium of claim 19, wherein executing the computer-executable instructions by the at least one processor further causes the at least one processor to perform operations comprising:
   determining that execution of the pairing procedure was successful; and
   establishing a communications channel utilizing a data transfer transport, the communications channel being established based at least in part on determining that the execution of the pairing procedure was successful.

21. The computer-readable storage medium of claim 20, wherein executing the computer-executable instructions by the at least one processor, further causes the at least one processor to perform operations comprising:
   maintaining a mapping between a plurality of communications transports and one or more supported features of the accessory device;
   identifying the short-range communications transport for the pairing procedure based at least in part on the mapping and the payload data, wherein the pairing procedure is executed utilizing the short-range communications transport; and
   selecting the data transfer transport based at least in part on the mapping and the payload data; and
   executing a data transfer procedure to initialize a data transfer channel utilizing the data transfer transport.

22. The computer-readable storage medium of claim 19, wherein executing the computer-executable instructions by the processor, further causes the at least one processor to perform operations comprising, prior to identifying the device type associated with the accessory device:
   extracting an identifier from the payload data; and
   determining that the identifier is not associated with a stored media asset.

* * * * *